United States Patent
Abeysinghe et al.

(10) Patent No.: US 11,725,569 B1
(45) Date of Patent: Aug. 15, 2023

(54) AIR DUCT FOR WATER INGRESS MANAGEMENT IN A VEHICLE

(71) Applicant: Honda Motor Co., Ltd., Tokyo (JP)

(72) Inventors: Pubudu C. Abeysinghe, Marysville, OH (US); Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/854,480

(22) Filed: Jun. 30, 2022

(51) Int. Cl.
*F01P 5/06* (2006.01)
*F01P 11/06* (2006.01)
*B60T 5/00* (2006.01)

(52) U.S. Cl.
CPC ............... *F01P 5/06* (2013.01); *B60T 5/00* (2013.01); *F01P 11/06* (2013.01); *F01P 2011/066* (2013.01)

(58) Field of Classification Search
CPC ........ F01P 5/06; F01P 11/06; F01P 2011/066; B60T 5/00
See application file for complete search history.

(56) References Cited

U.S. PATENT DOCUMENTS

| | | | | |
|---|---|---|---|---|
| 5,121,818 A | * | 6/1992 | McComic | F16D 65/847 188/71.6 |
| 5,495,909 A | | 3/1996 | Charles | |
| 7,600,615 B2 | * | 10/2009 | Ramsay | B60T 5/00 188/71.6 |
| 8,474,557 B2 | | 7/2013 | Wolf | |
| 9,751,379 B2 | | 9/2017 | Weiss et al. | |
| 2007/0023238 A1 | * | 2/2007 | Ramsay | B60T 5/00 188/4 R |
| 2012/0071075 A1 | | 3/2012 | Wolf | |
| 2012/0318476 A1 | * | 12/2012 | Begleiter | B60T 5/00 165/51 |
| 2015/0274104 A1 | * | 10/2015 | Schneider | B60K 11/08 180/68.1 |
| 2016/0272258 A1 | * | 9/2016 | Gibson | B62D 37/02 |
| 2018/0264931 A1 | * | 9/2018 | Chae | B60T 5/00 |

FOREIGN PATENT DOCUMENTS

| | | | | |
|---|---|---|---|---|
| CN | 113443019 A | * | 9/2021 | ............ B60K 11/08 |
| DE | 3711682 A | * | 9/1988 | ............... B60T 5/00 |
| DE | 102008039728 A1 | | 3/2010 | |
| DE | 102010038350 A1 | * | 2/2012 | ............ B60K 11/04 |

(Continued)

*Primary Examiner* — Hung Q Nguyen
(74) *Attorney, Agent, or Firm* — Plumsea Law Group, LLC

(57) ABSTRACT

An air guide duct for water ingress management having at least one air inlet and at least one air outlet channel which has an upstream inlet opening in fluid communication with the at least one air inlet and a downstream outlet opening into at least one of the front wheel wells, whereby incoming air from the front end of the motor vehicle is guided into at least one of the front wheel wells. A bottom surface of the upstream inlet opening is disposed at a first vertical position and a bottom surface of the downstream outlet opening is disposed at a second vertical position, with the bottom surface of the downstream outlet opening being disposed lower than the bottom surface of the upstream inlet opening relative to the front wheel wells such that a height differential is defined between the first vertical position and the second vertical position.

20 Claims, 10 Drawing Sheets

(56) References Cited

FOREIGN PATENT DOCUMENTS

| | | | | |
|---|---|---|---|---|
| DE | 102010037614 | A1 | | 3/2012 |
| DE | 102012009909 | A1 | | 11/2013 |
| DE | 102013110204 | A1 * | 3/2015 | ......... B60H 1/00507 |
| DE | 102014104286 | A1 * | 10/2015 | ............ B60K 11/04 |
| DE | 102015009374 | A1 * | 3/2016 | ............ B60K 11/04 |
| DE | 102014018990 | A1 * | 6/2016 | ............... B60T 5/00 |
| DE | 102015207535 | A1 * | 10/2016 | |
| DE | 102017212312 | A1 * | 1/2019 | |
| DE | 102018104831 | A1 * | 9/2019 | |
| DE | 102020006425 | A1 * | 12/2020 | |
| FR | 2529517 | A1 * | 1/1984 | |
| JP | 59067144 | A * | 4/1984 | |
| KR | 20210056795 | A | 5/2021 | |
| WO | 2011023875 | A1 | 3/2011 | |
| WO | WO-2017190731 | A1 * | 11/2017 | |

\* cited by examiner

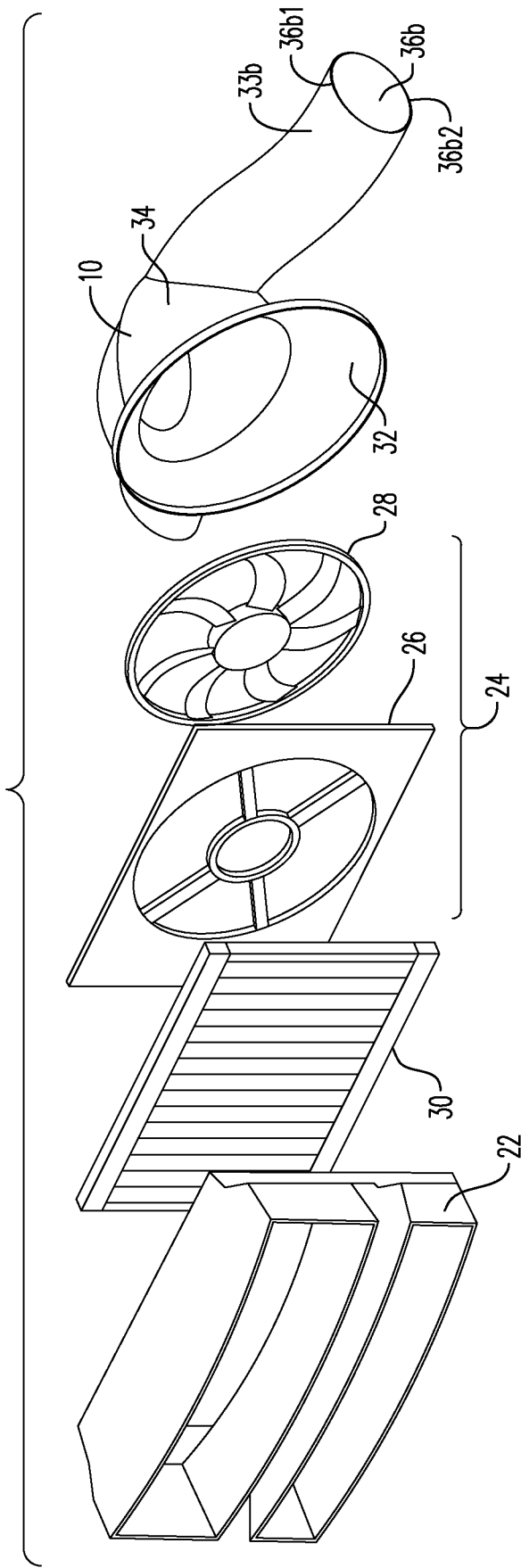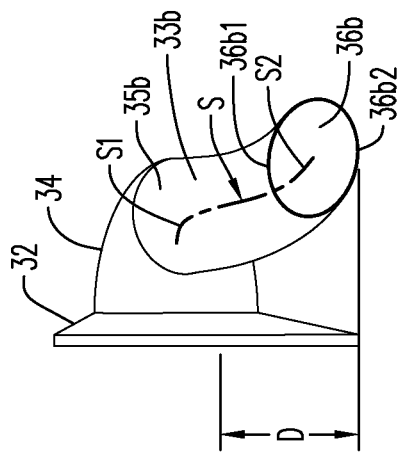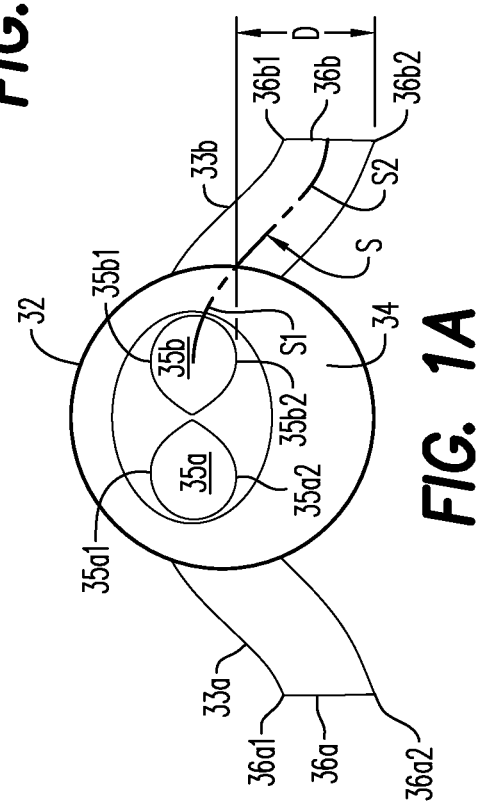
FIG. 1
FIG. 1A
FIG. 1B

AIR DUCT FOR WATER INGRESS MANAGEMENT IN A VEHICLE

BACKGROUND

1. Field of the Disclosure

The present disclosure relates to an air duct for a vehicle and, more particularly, to an air duct configured to reduce the ingress of water and/or debris into cooling system components of a vehicle, such as a radiator fan(s) and/or a heat exchanger.

2. Description of Related Art

Motor vehicles as known in the art generally include a heat exchanger or radiator system and a cooling fan assembly to draw cooling air through the same.

Radiator ducts used in some high performance or race vehicles have been designed to direct the discharge airflow from the cooling fan assembly through the hood of the vehicle. This type of prescribed air flow path is beneficial because it isolates the cooling system air flow and prevents it from unnecessarily contacting components within the engine compartment. Hence, the radiator duct can reduce air flow resistance to thereby improve aerodynamic drag as well as increase the air mass flow through the radiator system. However, such radiator ducts have also required a sizable amount of dedicated space within the engine compartment of the vehicle and, in the case of those discharging through the hood, substantially impact the overall design and aesthetics of the vehicle.

There is a need in the art for an air guide duct system and method configured to efficiently guide and discharge cooling air flow through a radiator system without impacting the exterior styling of the vehicle or requiring an unduly amount of space under the hood.

SUMMARY

The disclosure herein provides an air duct, and more particularly, an air duct for management of water and other debris ingress towards the cooling system components of a motor vehicle, such as a radiator fan(s) and/or a heat exchanger, and which also improves both the aerodynamics and thermodynamics without impacting the aesthetics or exterior styling of the vehicle.

In one aspect, the disclosure provides a motor vehicle including a front end; a pair of opposing front wheel wells rearward of the front end; and an air guide duct for water ingress management having at least one air inlet disposed forward of the front wheel wells and facing the front end of the motor vehicle. The air guide duct further includes at least one air outlet channel having an upstream inlet opening in fluid communication with the at least one air inlet and a downstream outlet opening into at least one of the front wheel wells such that incoming air from the front end of the motor vehicle is guided into at least one of the front wheel wells. The upstream inlet opening includes an upper surface and a lower surface and the downstream outlet opening includes an upper surface a lower surface. Further, the lower surface of the upstream inlet opening is disposed at a first vertical position and the lower surface of the downstream outlet opening is disposed at a second vertical position. The lower surface of the downstream outlet opening is disposed lower than the lower surface of the upstream inlet opening relative to the front wheel wells whereby a height differential is defined between the first vertical position and the second vertical position.

An air flow guiding method for water ingress management through a front end of a motor vehicle is also disclosed, including discharging air flow from at least one fan assembly into an air guide duct; directing air flow from at least one air inlet of the air guide duct, through a body of the air guide duct, and towards at least two opposing air outlet channels of the air guide duct; directing air flow from an upstream inlet opening of each of the at least two opposing air outlet channels towards a respective downstream outlet opening of each of the at least two opposing air outlet channels; discharging air flow from each of the downstream outlet openings into a respective wheel well of the motor vehicle; and mitigating water and debris ingress from the wheel wells into the at least two air outlet channels. Mitigating water and debris ingress includes positioning a lower surface of the upstream inlet openings of the at least two air outlet channels at a first vertical height and positioning a lower surface of the downstream outlet openings of the at least two air outlet channels at a second vertical height, such that the lower surface of each of the downstream outlet openings is disposed lower than the lower surface of each of the respective upstream inlet openings, relative to the wheel well.

In another aspect, the disclosure provides an air guiding system for water ingress management in a motor vehicle having a pair of opposing front wheel wells. The air guiding system includes an air guide duct having at least one air inlet configured to be disposed forward of the front wheel wells. The air guide duct further has a first air outlet channel having a first upstream inlet opening in fluid communication with the at least one air inlet and a first downstream outlet opening, and an opposing second air outlet channel having a second upstream inlet opening in fluid communication with the at least one air inlet and a second downstream outlet opening. The first and second upstream inlet openings each includes a top surface and a bottom surface and the first and second downstream outlet openings each include a top surface and a bottom surface. The first downstream outlet opening is configured to discharge air into one of the pair of opposing front wheel wells and the second downstream outlet opening is configured to discharge air into another of the pair of opposing front wheel wells such that incoming air is guided into the pair of opposing front wheel wells. The bottom surfaces of the first and second upstream inlet openings are disposed at a first vertical height and the bottom surfaces of the first and second downstream outlet openings are disposed at a second vertical height, with the bottom surfaces of the first and second downstream outlet openings being disposed lower than the bottom surfaces of the first and second upstream inlet openings, respectively, relative to the pair of opposing front wheel wells so as to mitigate water and debris ingress from the pair of opposing front wheel wells into the first and second air outlet channels.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 1 illustrates an exploded schematic view of an air duct for water ingress management in a vehicle according to a first exemplary embodiment of the disclosure herein.

FIG. 1A front view of the air duct shown in FIG. 1.

FIG. 1B is a side view of the air duct shown in FIG. 1.

DETAILED DESCRIPTION

The disclosure herein is directed to an air duct for water and debris ingress management and for discharge of air flow from the cooling fan assembly into at least one of the wheel wells of a motor vehicle. While the use of a radiator duct to discharge air flow into the top or through the hood of an engine compartment is known, as is the conventional use of wheel wells to discharge the engine compartment air flow, it has not previously been contemplated to use the wheel wells in conjunction with an air duct for water and debris ingress management to improve the both the aerodynamics and thermodynamics of a vehicle.

Figure 2:
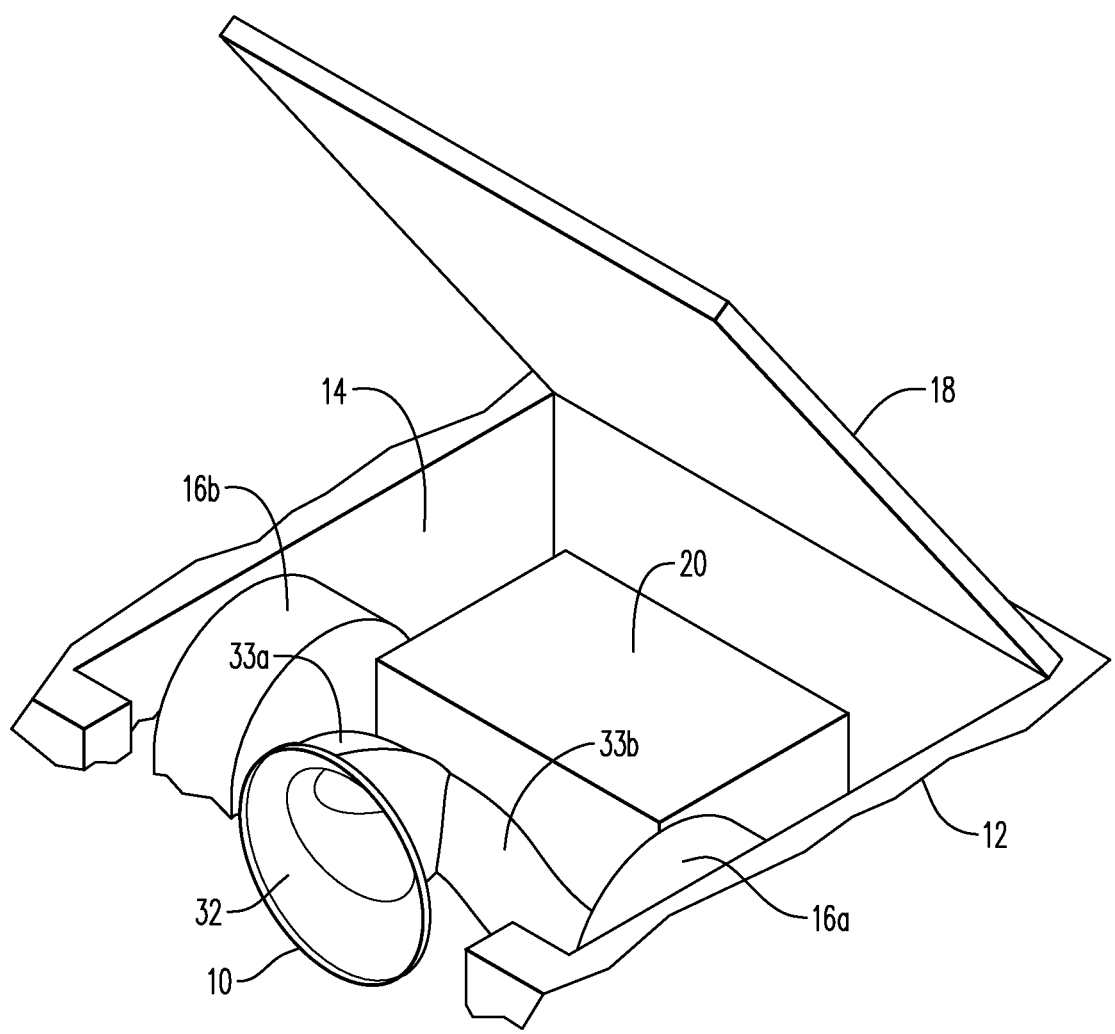
FIG. 2 is a schematic perspective view of the air duct for water ingress management in a vehicle according to the first exemplary embodiment of the disclosure herein, with certain components removed for clarity.
Figure 3:
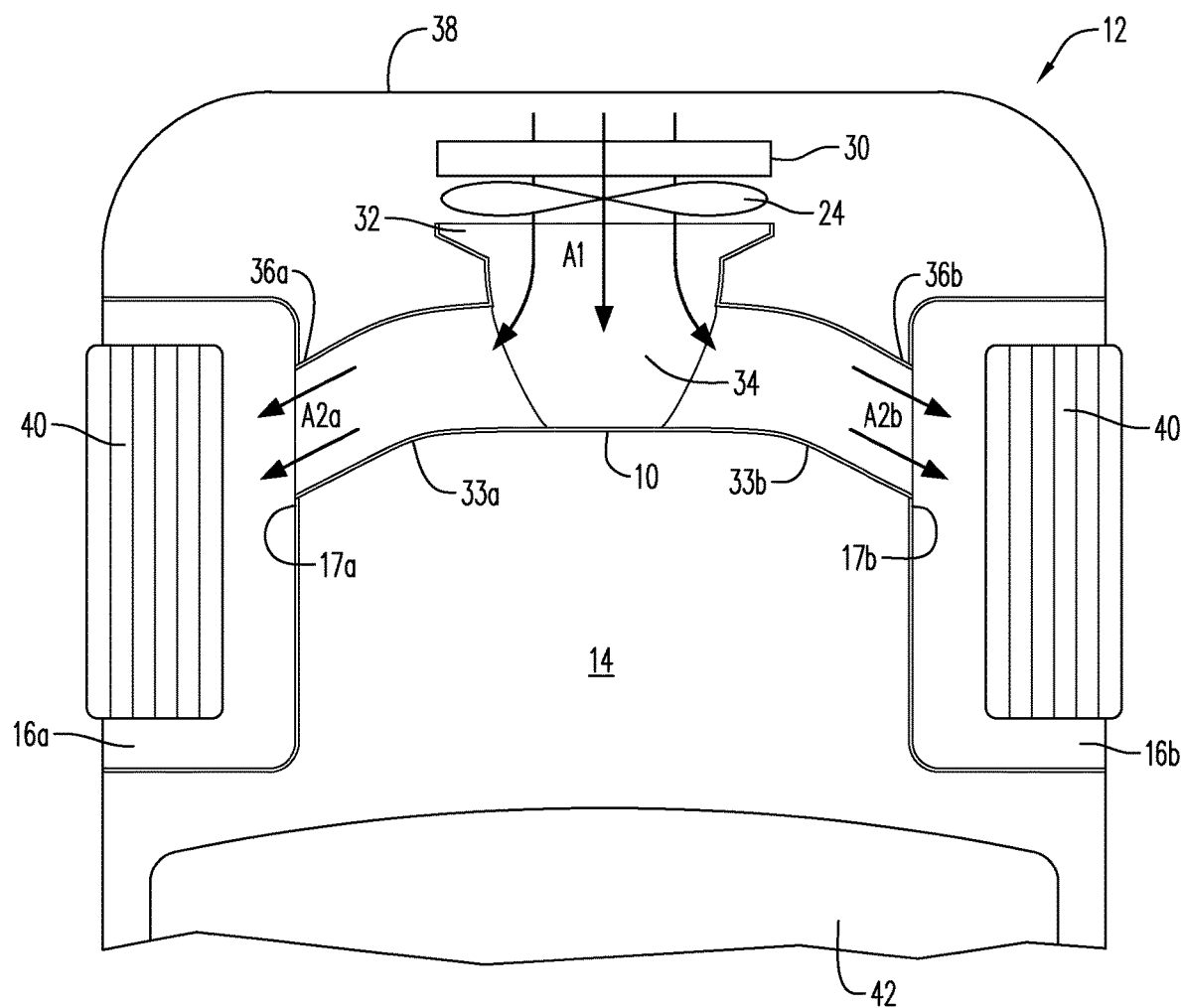
FIG. 3 is a schematic view of the air duct for water ingress management in a vehicle according to the first exemplary embodiment of the disclosure herein.

Referring to FIGS. 1-3, a first exemplary embodiment of an air guide duct for water and debris ingress management is shown generally by reference numeral 10. The air guide duct 10 is disposed under the hood 18 of a motor vehicle 12, generally between the air intake guide 22 and the motor 20, such that the air guide duct 10 receives the discharge air flow from a cooling system having at least one cooling fan assembly 24 in the front compartment 14 of the vehicle 12 and discharges the air flow into the wheel wells 16a, 16b. The cooling fan assembly 24 generally includes a fan shroud 26 and at least one fan 28 to assist with air flow. The vehicle 12 also includes a heat exchanger assembly 30 within the front compartment 14 of the vehicle 12. However, the fan assembly 24 is not always operating, i.e., may not operate unless engine load determines that additional air flow is needed. Alternatively, according to a further embodiment of the disclosure, motor vehicle 12 may not include a fan assembly 24. That is, when the vehicle 12 is traveling at speed, sufficient air may pass through the heat exchanger assembly 30 so as to obviate the need for additional air flow as provided by the cooling fan assembly 24.

According to the first exemplary embodiment of the disclosure, air guide duct 10 includes an air inlet opening 32 defining a first air flow dimension, a duct body portion 34 into which air flows after entering through the air inlet opening 32, and opposing air outlet channels 33a, 33b extending from and in fluid communication with the body portion 34. Each of the air outlet channels 33a, 33b includes an upstream opening 35a, 35b, respectively, adjoining the body portion 34 and a downstream opening 36a, 36b defining the air outlets of the air guide duct 10. The upstream opening 35a has an upper or top surface 35a1 and a lower or bottom surface 35a2. Similarly, the upstream opening 35b has an upper or top surface 35b1 and a lower or bottom surface 35b2. The downstream opening 36a has an upper or top surface 36a1 and a lower or bottom surface 36a2. Similarly, the downstream opening 36b has an upper or top surface 36b1 and a lower or bottom surface 36b2. The air outlet channels 33a, 33b define a second air flow dimension and discharge the air flow into a respective wheel well 16a, 16b by way of the downstream opening 36a, 36b. The air inlet opening 32 is disposed forward of the front wheel wells 16a, 16b and the opening 32 is facing the front end of the motor vehicle 12. Hence, air enters through the air intake guide 22 on the front end 38 of the vehicle 12 and is drawn or sucked through the heat exchanger 30 by the fan assembly 24. The air inlet 32 then receives the discharge air flow A1 from the fan assembly 24 such that the air guide duct 10 defines the air flow path through the front compartment 14. More particularly, the air guide duct 10 directs the air flow laterally outward and downwards via the air outlet channels 33a, 33b which discharge the air flow A2a, A2b through an inboard side surface 17a, 17b of the respective wheel wells 16a, 16b, inboard of the tires 40. One skilled in the art will appreciate that such interaction of the discharge air with the tire and wheel will impair the aerodynamics of the vehicle. Accordingly, the air guide duct according to the disclosure herein is configured to achieve a balance between the angle of discharged air flow impinging upon the wheel and tire and the desired aerodynamic and thermodynamic performance of the vehicle.

Since the discharge from the air duct is in fluid communication with the wheel wells 16a, 16b through the downstream outlet openings 36a, 36b, it is possible that the rotating tires 40 could cause water, snow, other debris from the road surface, or the like to be thrown towards the downstream outlet openings 36a, 36b. If such water or other debris were to further move laterally inward towards the body portion 34 of the air duct and contact the fan assembly 24, the fan assembly could be damaged or corroded by the debris or moisture intrusion. Hence, it is beneficial to mitigate any water or debris from reaching the air duct inlet 32 and potentially the fan assembly 24 of the heat exchanger or radiator 30 since water or moisture ingress can lead to corrosion and debris ingress can damage the fan assembly and/or radiator. Further, water ingress can impact the cooling performance of the cooling system, introduce noise, vibration and harshness concerns, and influence the overall driving experience.

As shown best in FIGS. 1A and 1B, there is a height differential D between the bottom surfaces 35a2, 35b2 of the upstream openings 35a, 35b and the bottom surfaces 36a2, 36b2 of the respective downstream outlet openings 36a, 36b. The difference in height D assists in preventing water and other debris ingress from the wheel wells 16a, 16b to the air outlet channels 33a, 33b. More particularly, because the bottom surface of the downstream outlet openings 36a, 36b are lower in vertical height than the bottom surface of the respective upstream openings 35a, 35b (by the height differential D), gravity will cause any such water, snow, or debris to drain or fall back downwards towards the downstream outlet openings 36a, 36b rather than allowing the ingress of the same to the air duct inlet 32. The top surfaces 35a1, 35b1 of the inlet openings 35a, 35b and the top surfaces 36a1, 36b1 of the outlet openings 36a, 36b may be disposed at the same vertical height (or the top surfaces of the outlet openings may even be above the top surfaces of the inlet openings) and still achieve the desired water management function according to the disclosure herein as long as the bottom surface of the outlet opening is disposed lower than the bottom surface of the respective inlet opening.

In addition, the air outlet channels 33a, 33b are provided with a curved configuration in order to further inhibit water and debris ingress. With reference to FIGS. 1A and 1B, the air outlet channels 33a, 33b are configured with a first curvature portion S1 in a first plane and a second curvature portion S2 in a second plane so as to form an approximately "5-shaped" channel as shown by the dashed line. In the first exemplary embodiment of the disclosure, the first and second curvatures S1 and S2 result in the downstream outlet openings 36a, 36b being offset, i.e., further rearward, than the upstream openings 35a, 35b so as to further mitigate water and debris ingress. Thus, the vertical height differential D in conjunction with the opposing curvatures of S1 and S2 create a serpentine path rendering the ingress of water and debris to the fan assembly most unlikely. Alternatively, the air outlet channels could be curved to form a C-shaped configuration or an L-shaped configuration.

As one skilled in the art will appreciate, depending on the configuration of the fan assembly and heat exchanger, air could also be pushed through the heat exchanger if the fan assembly was positioned in front of the heat exchanger. In either scenario, the prescribed air flow path defined by the air guide duct 10 isolates the cooling air flow and prevents it from contacting components within the front end compartment. It also reduces air flow losses and improves aerodynamic drag of the vehicle. The air guide duct 10 provides these improvements these while simultaneously not impacting the exterior styling of the vehicle. Also, with respect to the air flow dimensions defined above, the first and second air flow dimensions may be different or they may be the same. In the exemplary embodiment, the first air flow dimension is greater than the second air flow dimension but, in some instances, it may be beneficial to have the second air flow dimension be greater than the first air flow dimension.

Figure 4:
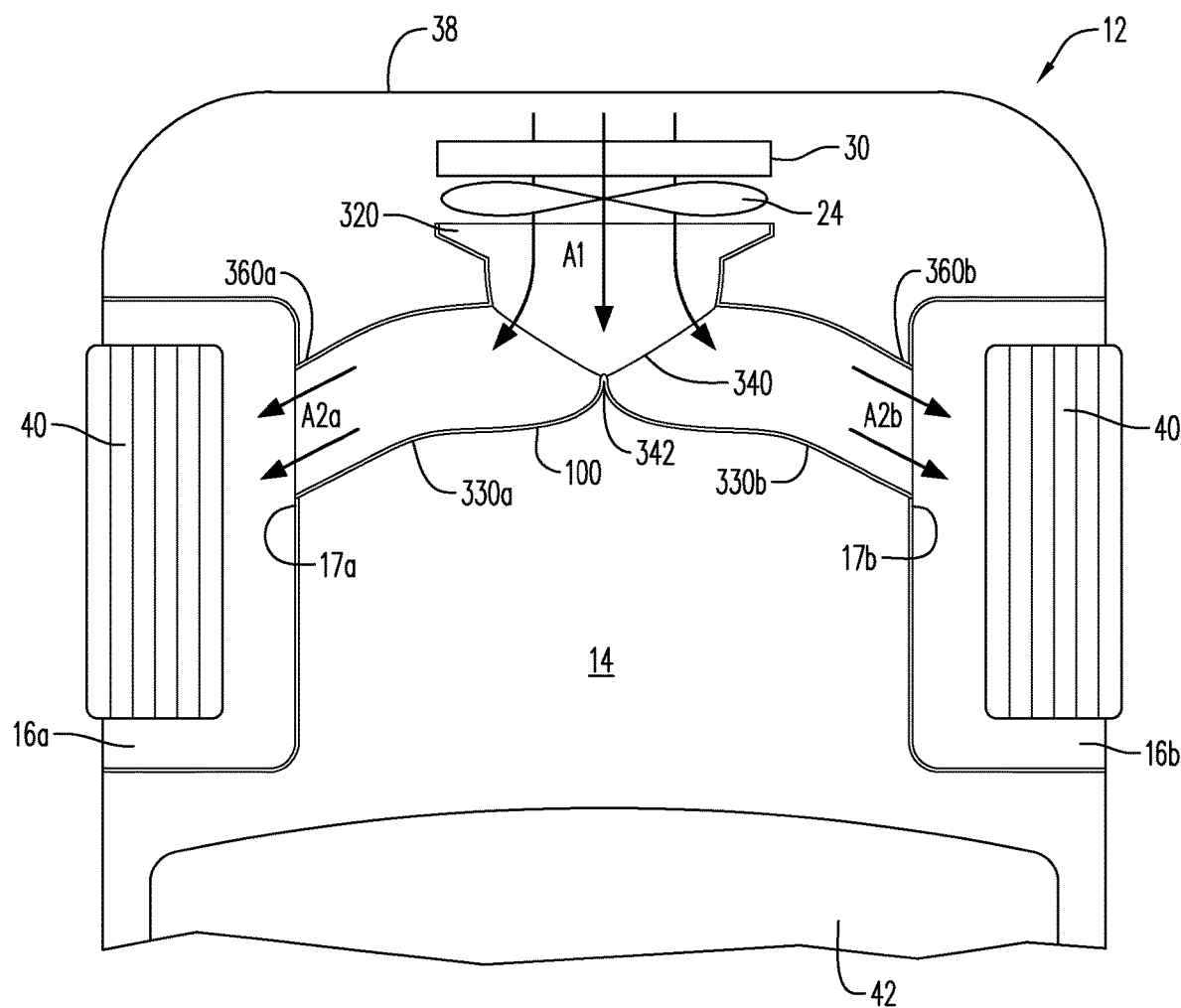
FIG. 4 is a schematic view of an air duct for water ingress management in a vehicle according to a second exemplary embodiment of the disclosure herein.

The air guide duct 10 is configured to provide maximized air mass flow through the body portion 34. However, depending upon the particular vehicle design and number of components in the front compartment 14 of the vehicle 12, there may not always be sufficient space to accommodate the body portion 34 of air guide duct 10. In such a situation, the air guide duct can also be packaged to take into consideration the space constraints within the front compartment of a vehicle. Accordingly, with reference to FIG. 4, a second exemplary embodiment of the disclosure herein provides an air guide duct 100 providing a more compact overall configuration which has a reduced air mass flow relative to that of air guide duct 10. Air guide duct 100 is particularly useful when the area under the hood in the front compartment is also used for a storage compartment or to house other components such as harnesses, wiring, drive-train components, pumps, and the like. Air guide duct 100 includes an air inlet 320 defining a first air flow dimension, a body portion 340, and downstream air outlets 360a, 360b each defining a second air flow dimension. In this instance, the body portion 340 is "pinched" so as to decrease the overall vertical dimension of the air guide duct 100 adjacent the air inlet 320 and thereby define a third air flow dimension. In the exemplary embodiment herein, the third air flow dimension is less than the first and second air flow dimensions. The pinch 342 is provided in the central area of the body portion 340 generally midway between downstream openings 360a and 360b. The pinch 342 thus forms a first outlet channel 330a leading to downstream opening 360a and a second outlet channel 330b leading to downstream opening 360b. Similar to the first exemplary embodiment of air guide duct 10, the air inlet opening 320 is disposed forward of the front wheel wells 16a, 16b and the opening 320 is facing the front end of the motor vehicle 12. Hence, air enters through the air intake guide 22 on the front end 38 of the vehicle 12 and is drawn or sucked through the heat exchanger 30 by the fan assembly 24. The air inlet opening 320 then receives the discharge air flow A1 from the cooling system including the fan assembly 24 such that the air guide duct 100 defines the air flow path through the front compartment 14. More particularly, the pinch 342 of the air guide duct 100 directs the air flow laterally outward and downward from the air inlet opening 320, through the upstream openings (not shown) into the first and second outlet channels 330a, 330b, and to the downstream openings 360a, 360b which discharge the air flow into the respective wheel wells 16a, 16b inboard of the tires 40. As one skilled in the art will appreciate, depending on the configuration of the fan assembly and heat exchanger, air could also be pushed through the heat exchanger if the fan assembly was positioned in front of the heat exchanger. Further, the shape of the overall air duct package can be sized, formed, and positioned for use in conventional internal combustion motor vehicles as well as electric vehicles. Moreover, depending upon the specific vehicle constraints, the first and second outlet channels 330a, 330b, as well as the air 360a, 360b, do not necessarily have to be symmetrical in size and configuration.

The air guide duct 100 according to the second exemplary embodiment of the disclosure also includes a height differential D between the bottom surface of the upstream openings (not shown) and the bottom surface of the respective downstream outlet openings 360a, 360b as described above with reference to air guide duct 10. The air outlet channels 330a, 330b in air guide duct 100 are also configured with a first curvature S1 in a first plane and a second curvature S2 in a second plane so as to form an approximately "S-shaped" channel, as described above with reference to air guide duct 10. As such, further description of the height differential D and S-shaped configuration is not necessary for the second exemplary embodiment air guide duct 100 disclosed herein. Similarly, the air outlet channels 330a, 330b could be curved to form a C-shaped configuration or an L-shaped configuration as in the first exemplary embodiment discussed above.

Figure 5:
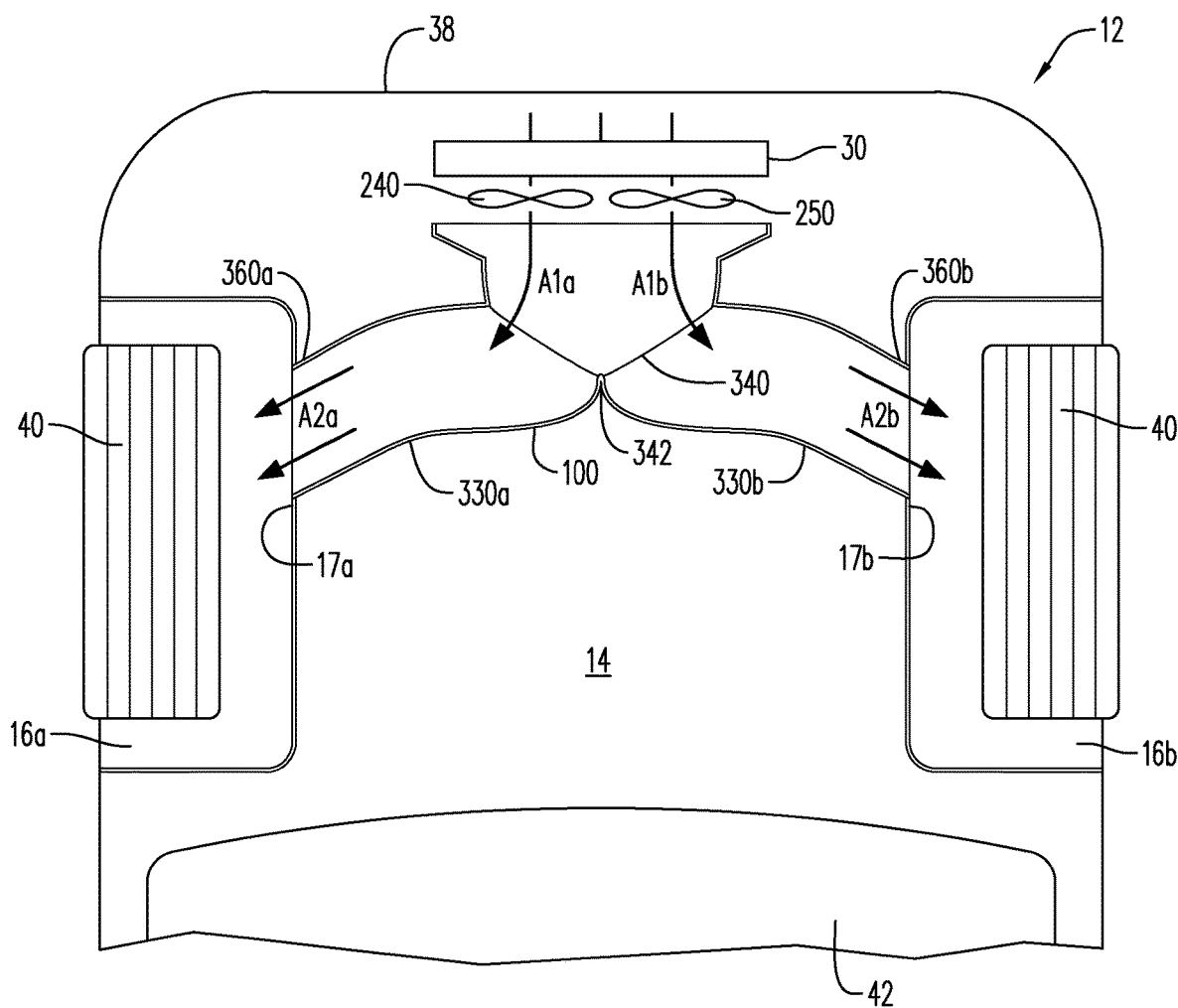
FIG. 5 is a schematic view of an air duct for water ingress management in a vehicle according to a third exemplary embodiment of the disclosure herein.

In each of the first and second exemplary embodiments described above, a fan assembly 24 is provided to draw the air flow through the heat exchanger 30 and then discharge the air flow into the air guide duct 10, 100. Another aspect of the disclosure herein further improves this operation by providing more than one fan assembly in the cooling system so as to increase the air mass flow rate. As illustrated in FIG. 5, a third exemplary embodiment of the disclosure provides a first fan assembly 240 and second fan assembly 250 utilized in connection with the air guide duct 100. Hence, air enters through the air intake guide 22 on the front end 38 of the vehicle 12 and is drawn or sucked through the heat exchanger 30 by the fan assemblies 240, 250. The air inlet 320 then receives the discharge air flow A1a from the cooling system including the fan assembly 240 and the discharge air flow A1b from the fan assembly 250 such that the air guide duct 100 defines the air flow path through the front compartment 14. In this instance, the air flows A1a and A1b from the fan assemblies 240, 250, respectively, are merged together within the body portion 340 of air guide duct 100 and air flow A2a and A2b is directed laterally outward and downward through the first and second outlet channels 330a, 330b to the air outlets 360a, 360b which discharge the air flow A2a and A2b into the respective wheel wells 16a, 16b inboard of the tires 40. FIG. 5 is shown with pinched air guide duct 100 being used together with first and second fan assemblies 240, 250, but one skilled in the art will appreciate that air guide duct 10 could also be provided with more than one fan assembly.

Figure 6:
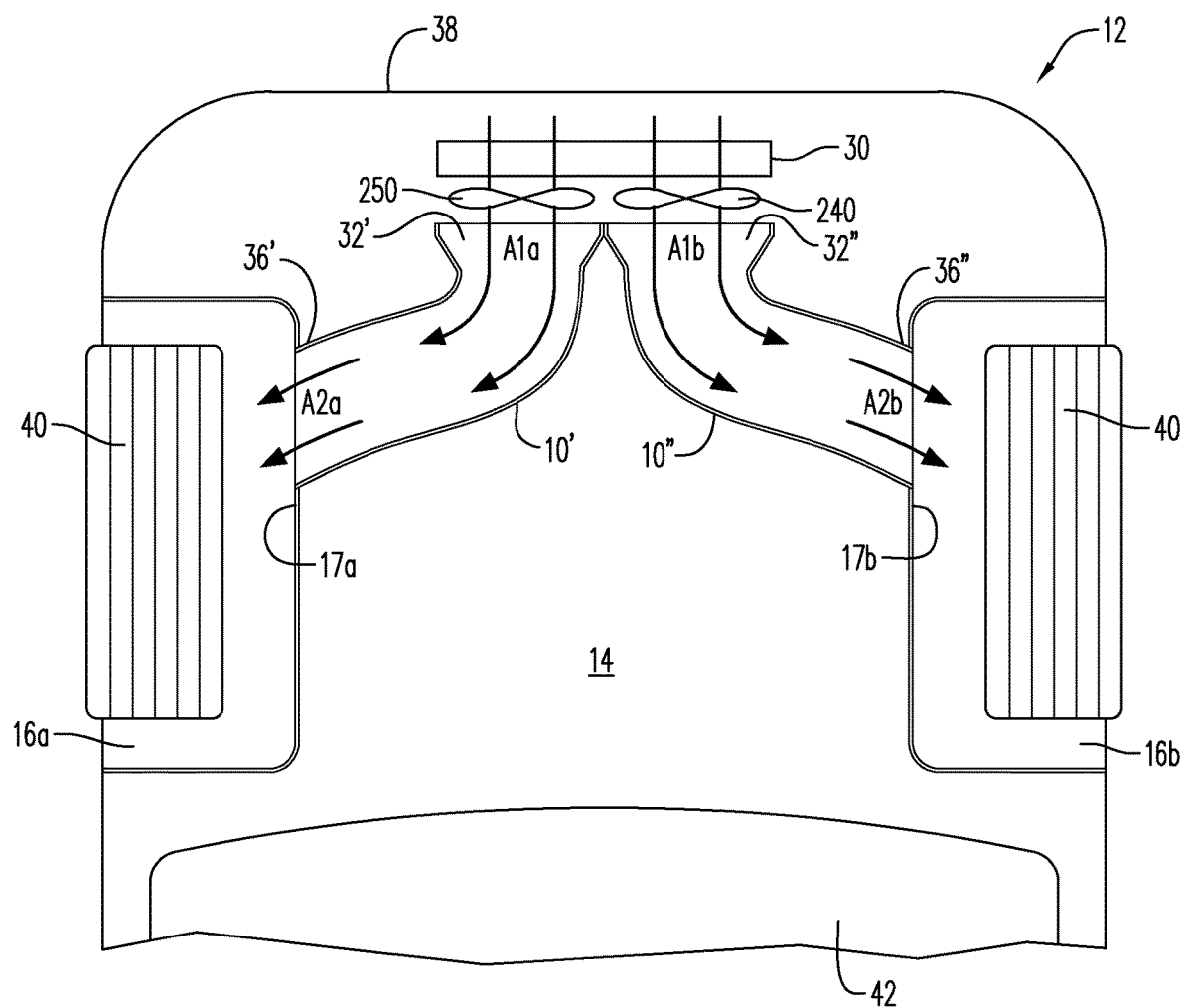
FIG. 6 is a schematic view of an air duct for water ingress management in a vehicle according to a fourth exemplary embodiment of the disclosure herein.

A further exemplary embodiment of the disclosure utilizing a cooling system having first and second fan assemblies 240, 250 is shown in FIG. 6. In this fourth embodiment of the disclosure, a first air guide duct 10' and a second air guide duct 10" are provided. First air guide duct 10' receives the air discharged from the first fan assembly 240 and directs the air flow to be discharged into the wheel well 16a. Second air guide duct 10" receives the air discharged from the second fan assembly 250 and directs the air flow to be discharged into the wheel well 16b. In this embodiment, the air flow A1a from the first fan assembly 240 and the air flow A1b from the second fan assembly 250 do not merge. Rather, the air inlet 32' on first air guide duct 10' receives the discharge air flow A1a from the fan assembly 240 and directs the air to the downstream opening 36a' which discharges the air flow A2a into wheel well 16a. Similarly, the air inlet 32" on the second air guide duct 10" receives the discharge air flow A1b from the fan assembly 250 and directs the air to the downstream opening 36b' which discharges the air flow A2b into the wheel well 16b.

The air guide duct 10', 10" according to the fourth exemplary embodiment of the disclosure also includes a height differential D between the bottom surface of the upstream openings (not shown) and the bottom surface of the respective downstream outlet openings 36', 36" as described above with reference to air guide duct 10. The air outlet channels 33', 33" in air guide duct 10', 10" are also configured with a first curvature S1 in a first plane and a second curvature S2 in a second plane so as to form an approximately "S-shaped" channel, as described above with reference to air guide duct 10. As such, further description of the height differential D and S-shaped configuration is not necessary for the fourth exemplary embodiment air guide duct 10', 10" disclosed herein. Similarly, the air outlet channels 33', 33" could be curved to form a C-shaped configuration or an L-shaped configuration as in the first exemplary embodiment discussed above.

In each of the above described embodiments, the inner surface of the air duct 10, 100, 10', 10" may be smooth (slick) or portions of the interior of the duct may have a textured surface or feature configured to impact the flow of the air therethrough. While the following FIGS. 7-9 utilize air guide duct 10 to illustrate examples of texturing and features that can be applied to the inner duct surface, one skilled in the art will understand that such texturing and features can be provided on any of the exemplary air guide ducts embodiments disclosed herein.

Figure 7:
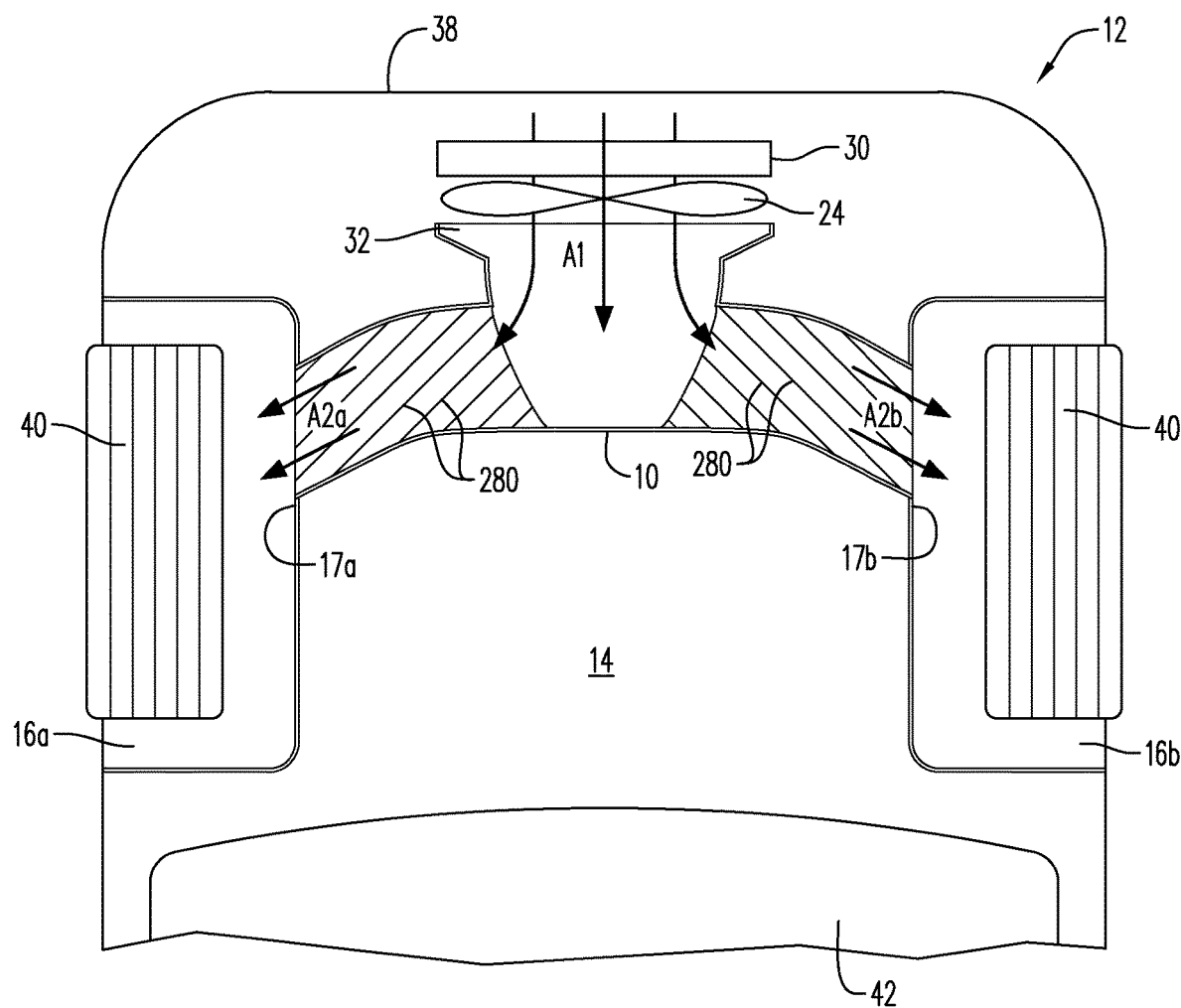
FIG. 7 is a schematic view of an air duct for water ingress management in a vehicle according to a fifth exemplary embodiment of the disclosure herein.

More particularly, FIG. 7 schematically illustrates a texture pattern 280 lining portions of the interior surface of the air guide duct 10. The texture pattern 280 can include, by way of nonlimiting example, a rifled (spiral) surface, a dimpled surface (circular in shape or otherwise), steps, fins, ribs, grooves, vortex generators, or any other geometry that is capable of locally energizing and changing the rotationality or angularity of the airflow and/or directing airflow through the air guide duct. The texture pattern 280 can be provided along the path of the airflow, across the path of the airflow, or anywhere therebetween as necessary to create the desired aerodynamic flow from the air inlet to the one or more air outlets. The use of texture pattern 280 can also be beneficial to further deter the ingress of water and debris from the wheel wells 16a, 16b into the air duct 10.

Figure 8:
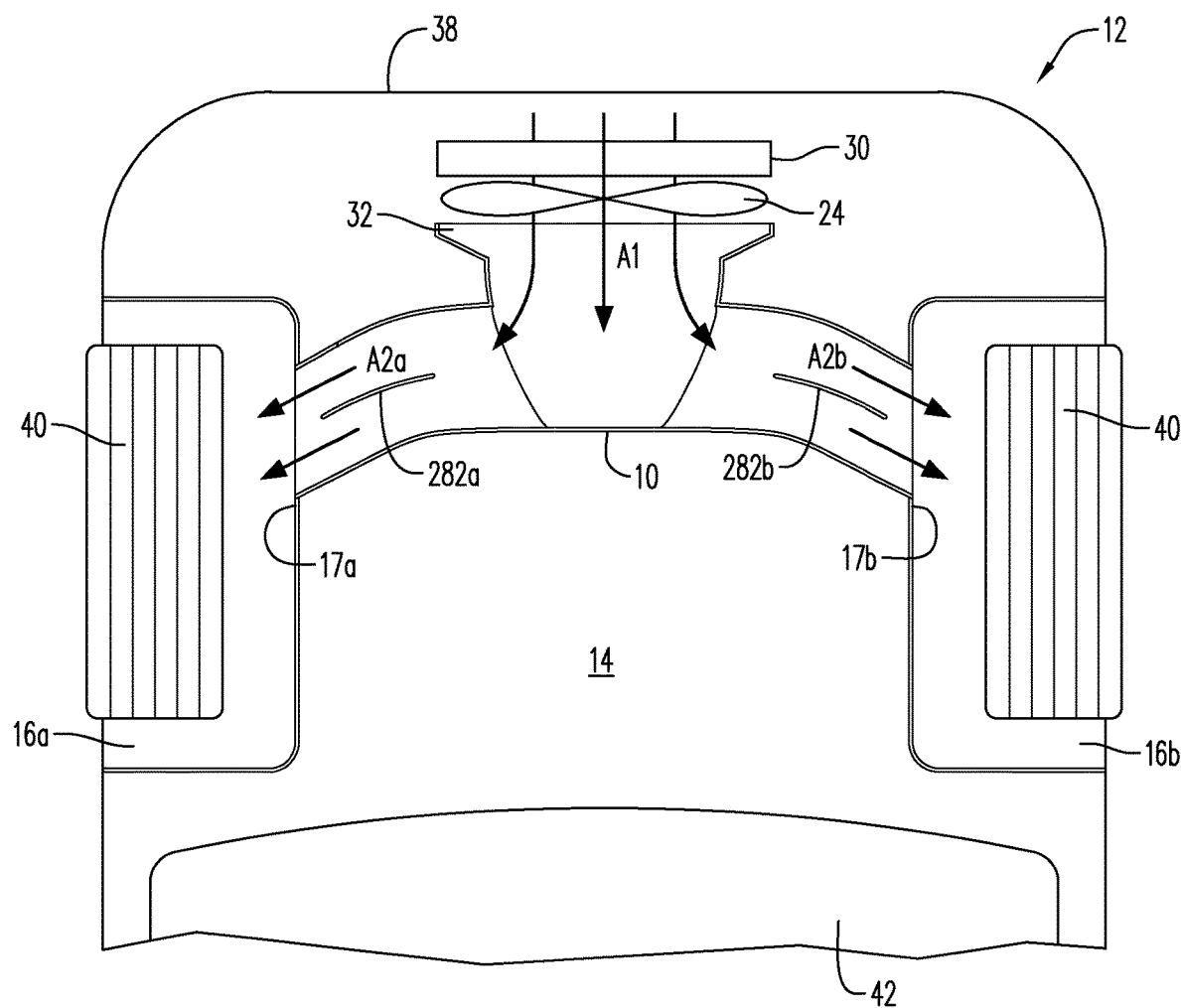
FIG. 8 is a schematic view of an air duct for water ingress management in a vehicle according to a sixth exemplary embodiment of the disclosure herein.

Referring also to FIG. 8, airflow directionality is improved by providing body guide vanes 282a, 282b within the body portion 34 of the air duct. In the sixth exemplary embodiment disclosed herein, the guide vanes 282a, 282b have a curved configuration to assist incoming air flow A1 to be redirected downwards to one or more of the wheel wells 16a, 16b. That is, a portion of air flow A1 is redirected along guide vane 282a in order to be more efficiently directed to wheel well 16a and a further portion of air flow A1 is redirected along guide vane 282b in order to be more efficiently directed to wheel well 16b. According to an exemplary embodiment of the disclosure, the guide vanes 282a, 282b extend along the entire cross-sectional height of the air guide duct, although this is not absolutely necessary and guide vanes having a lesser height can of course also be used. The use of guide vanes 282a, 282b can also be beneficial to further deter the ingress of water and debris from the wheel wells 16a, 16b into the air duct 10 by providing a physical barrier within the air out channels 33a, 33b.

Figure 9:
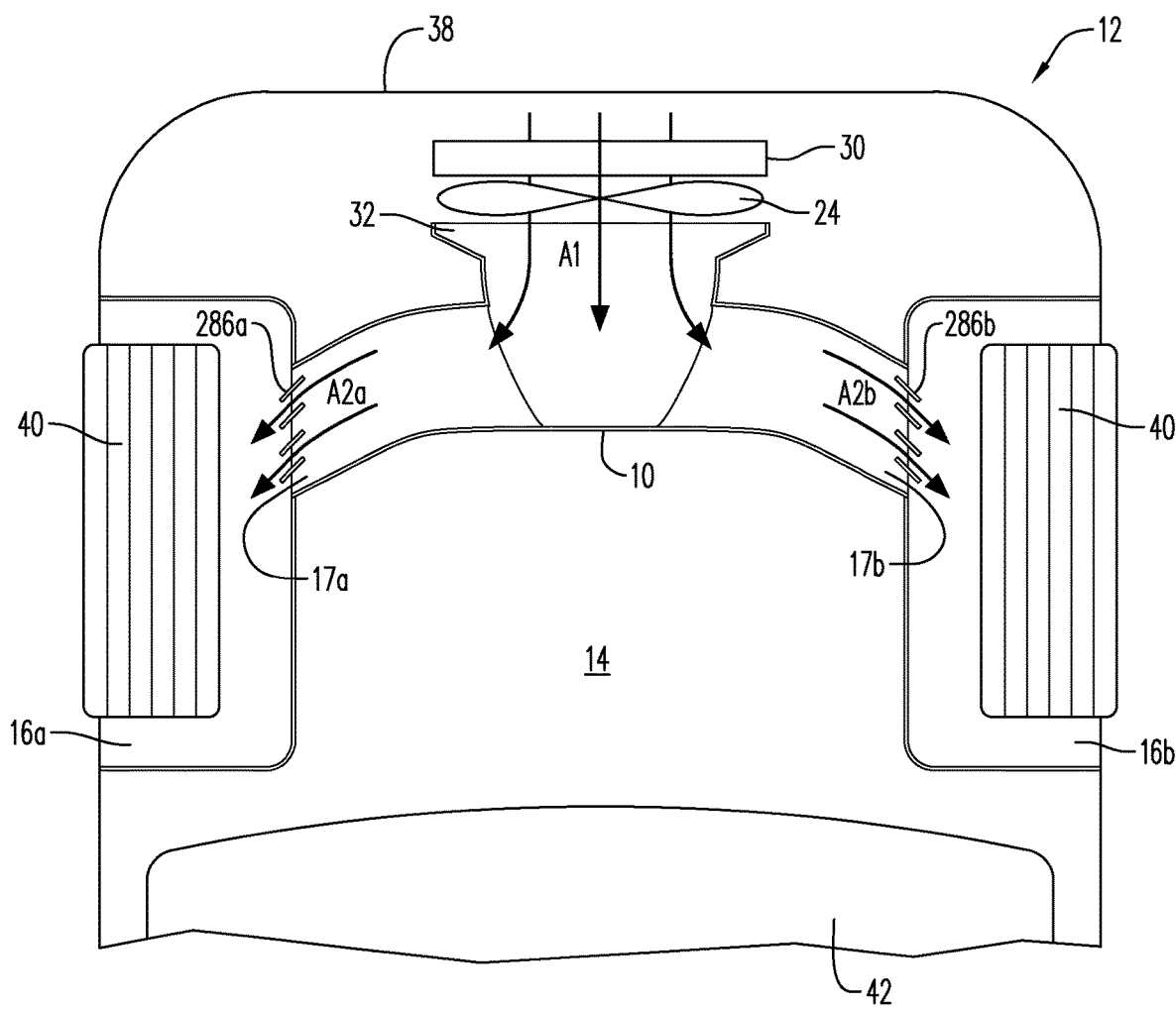
FIG. 9 is a schematic view of an air duct for water ingress management in a vehicle according to a seventh exemplary embodiment of the disclosure herein.

Similar to the above-described embodiment and with reference also to the seventh embodiment of the disclosure shown in FIG. 9, airflow directionality and flow dynamics can also be improved by providing one or more vanes or louvres 286a, 286b within the downstream openings 36a, 36b. The louvres 286a, 286b assist in providing a smoother discharge of air flow A2a, A2b exiting from the guide duct into the respective wheel wells 16a, 16b and can also direct the outlet air in a predetermined direction. By way of example, the louvres 286a, 286b may be disposed in a horizontal orientation, or the louvres 286a, 286b may be disposed in a predetermined angled position relative to the longitudinal axis of the vehicle, such as the rearwardly direction illustrated in FIG. 9. The louvres 286a, 286b may be provided with a fixed angle, i.e., not movable, or they may also be movable to the desired angle. The use of vanes or louvres 282a, 282b can also be beneficial to further deter the ingress of water and debris from the wheel wells 16a, 16b into the air duct 10 by providing a physical barrier at the downstream openings 36a, 36b.

Figure 10:
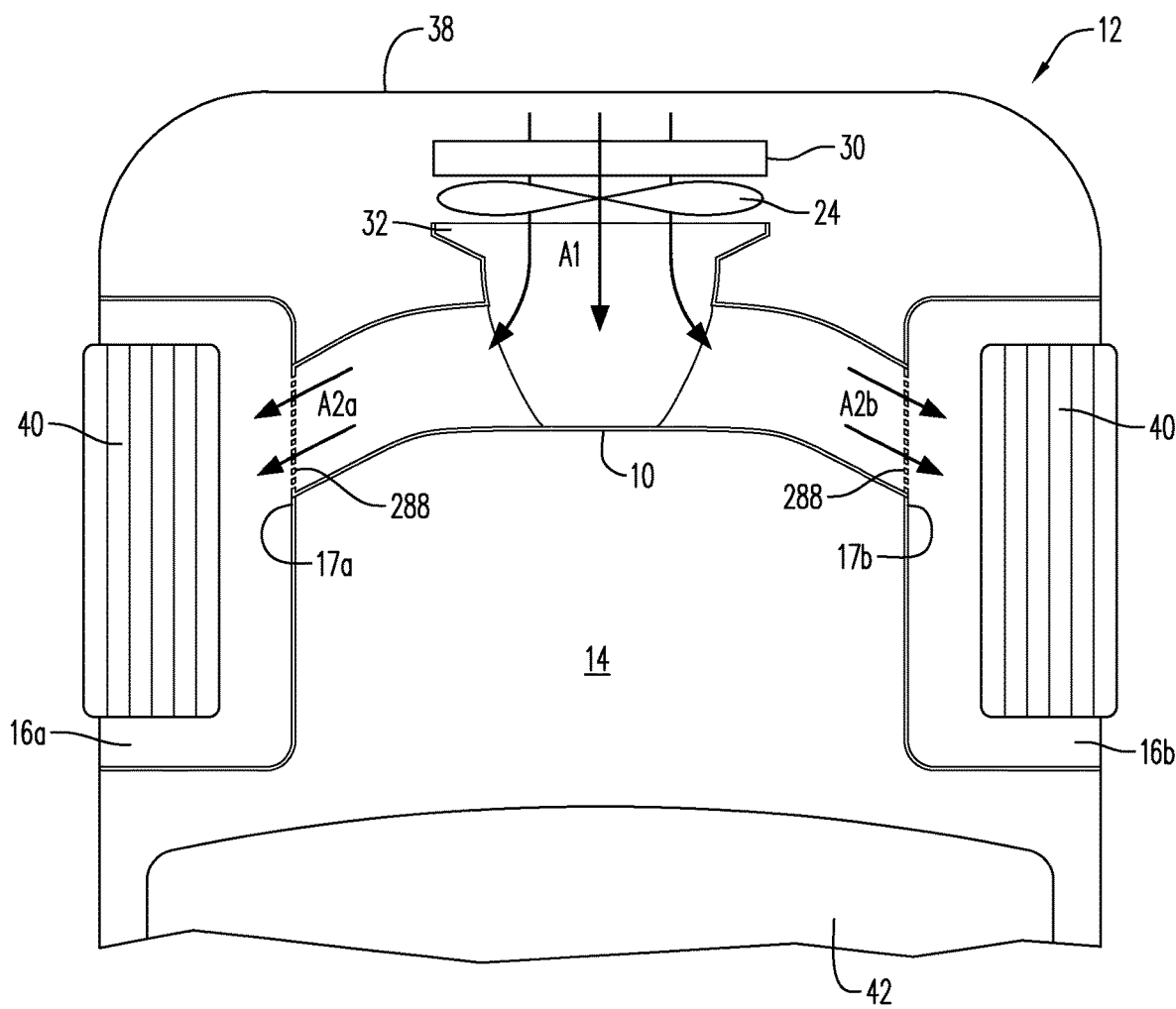
FIG. 10 is a schematic view of an air duct for water ingress management in a vehicle according to an eighth exemplary embodiment of the disclosure herein.

Because the discharge from the air duct is in fluid communication with the wheel wells 16a, 16b through the downstream openings 36a, 36b, the downstream openings 36a, 36b also make the internal air guide duct components vulnerable to rodents and other small pests entering the air guide duct. In order to avoid any such adverse matter or life form from entering into the air duct and reaching the fan(s), a protective covering 288 can be applied across the discharge opening of the downstream openings 36a, 36b, as shown in FIG. 10. The protective covering 288 can include a mesh, net, wire, webbing or similar covering having openings sufficient to allow the air to be discharged out from the downstream outlet openings 36a, 36b while still substantially preventing the intrusion of any type of object or life form that could cause potential harm to the air duct or vehicle. The material from which protective covering 288 is made is not particularly limited and can include metal, plastic, rubber or any material capable of performing the necessary function. In addition to small animals, the protective covering 288 can also be beneficial in mitigating the ingress of debris and water into the air duct 10 since it provides a physical covering over the downstream outlet openings 36a, 36b.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A motor vehicle comprising:
   a front end;
   a pair of opposing front wheel wells rearward of the front end; and
   an air guide duct for water ingress management having at least one air inlet disposed forward of the front wheel wells and facing the front end of the motor vehicle, the air guide duct further including at least one air outlet channel having an upstream inlet opening in fluid communication with the at least one air inlet and a downstream outlet opening into an inboard side surface of at least one of the front wheel wells such that incoming air from the front end of the motor vehicle is guided into at least one of the front wheel wells;
   wherein the upstream inlet opening includes an upper surface and a lower surface;
   wherein the downstream outlet opening includes an upper surface and a lower surface;
   wherein the lower surface of the upstream inlet opening is disposed at a first vertical position and the lower surface of the downstream outlet opening is disposed at a second vertical position, the lower surface of the downstream outlet opening being disposed lower than the lower surface of the upstream inlet opening relative to the front wheel wells, whereby a height differential is defined between the first vertical position and the second vertical position.

2. The motor vehicle according to claim 1, wherein the at least one air outlet channel defines a first curvature portion and a second curvature portion forming an approximately "S-shaped" configuration.

3. The motor vehicle according to claim 2, wherein the downstream outlet opening is offset further rearward from the front end of the motor vehicle than the upstream inlet opening of the at least one air outlet channel.

4. The motor vehicle according to claim 1, further comprising a heat exchanger, wherein the air guide duct directs air flow passing through the heat exchanger into at least one of the front wheel wells.

5. The motor vehicle according to claim 4, further comprising at least one fan assembly, wherein the air guide duct directs air flow discharged from the at least one fan assembly into at least one of the front wheel wells.

6. The motor vehicle according to claim 5, wherein the at least one fan assembly comprises a first fan assembly and a second fan assembly and the at least one air inlet comprises a first air inlet and a second air inlet, air flow through the first fan assembly configured to flow through the first air inlet and be guided into one of the pair of opposing front wheel wells and air flow through the second fan assembly configured to flow through the second air inlet and be guided into another one of the pair of opposing front wheel wells.

7. The motor vehicle according to claim 1, wherein an inner surface of the air guide includes a textured surface.

8. The motor vehicle according to claim 1, wherein an inner surface of the air guide duct includes at least one vane disposed to direct incoming air from the at least one air inlet towards the downstream outlet opening and into at least one of the front wheel wells.

9. The motor vehicle according to claim 1, wherein the downstream outlet opening includes a protective mesh between an air outlet opening and a respective front wheel well.

10. The motor vehicle according to claim 1, wherein the at least one air inlet defines a first flow area dimension and the at least one air outlet channel defines a second flow area dimension, wherein the air guide duct further includes a pinched region defining a third flow area dimension, the third flow area dimension being less than the first flow area dimension and the second flow area dimension.

11. An air guiding system for water ingress management in a motor vehicle having a pair of opposing front wheel wells, the air guiding system comprising:
    an air guide duct having at least one air inlet configured to be disposed forward of the front wheel wells, the air guide duct further having a first air outlet channel having a first upstream inlet opening in fluid communication with the at least one air inlet and a first downstream outlet opening and an opposing second air outlet channel having a second upstream inlet opening in fluid communication with the at least one air inlet and a second downstream outlet opening, the first downstream outlet opening configured to discharge air into an inboard side surface of one of the pair of opposing front wheel wells and the second downstream outlet opening configured to discharge air into an inboard side surface of another of the pair of opposing front wheel wells such that incoming air is guided into the pair of opposing front wheel wells;
    wherein the first and second upstream inlet openings each includes a top surface and a bottom surface;
    wherein the first and second downstream outlet openings each include a top surface and a bottom surface;
    wherein the bottom surfaces of the first and second upstream inlet openings are disposed at a first vertical height and the bottom surfaces of the first and second downstream outlet openings are disposed at a second vertical height, the bottom surfaces of the first and second downstream outlet openings being disposed lower than the bottom surfaces of the first and second upstream inlet openings, respectively, relative to the pair of opposing front wheel wells so as to mitigate water and debris ingress from the pair of opposing front wheel wells into the first and second air outlet channels.

12. The air guiding system according to claim 11, wherein the first air outlet channel and the second air outlet channel each define a first curvature portion and a second curvature portion forming an approximately "S-shaped" configuration.

13. The air guiding system according to claim 11, wherein the first and second downstream outlet openings are offset further rearward from a front end of the motor vehicle than the first and second upstream inlet openings of the first air outlet channel and the second air outlet channel, respectively.

14. The air guiding system according to claim 11, wherein an inner surface of the air guide duct includes a textured surface.

15. The air guiding system according to claim 11, wherein an inner surface of the air guide duct includes at least one guide vane disposed to direct incoming air from the at least one air inlet towards the first and second downstream outlet openings.

16. The air guiding system according to claim 11, wherein the first and second downstream outlet openings include louvers configured to direct air flow into the front wheel wells.

17. The air guiding system according to claim 11, wherein each of the first and second air outlets includes a protective mesh configured to be between an air outlet opening and the front wheel wells.

18. An air flow guiding method for water ingress management through a front end of a motor vehicle, comprising:
- discharging air flow from at least one fan assembly into an air guide duct;
- directing air flow from at least one air inlet of the air guide duct, through a body of the air guide duct, and towards at least two opposing air outlet channels of the air guide duct;
- directing air flow from an upstream inlet opening of each of the at least two opposing air outlet channels towards a respective downstream outlet opening of each of the at least two opposing air outlet channels;
- discharging air flow from each of the downstream outlet openings into an inboard side surface of a respective wheel well of the motor vehicle; and
- mitigating water and debris ingress from the wheel wells into the at least two air outlet channels;
- wherein mitigating water and debris ingress includes positioning a lower surface of the upstream inlet openings of the at least two air outlet channels at a first vertical height and positioning a lower surface of the downstream outlet openings of the at least two air outlet channels at a second vertical height, such that the lower surface of each of the downstream outlet openings is disposed lower than the lower surface of each of the respective upstream inlet openings, relative to the wheel well.

19. The air flow guiding method for water ingress management according to claim 18, wherein mitigating water and debris ingress further includes providing a first curvature portion and a second curvature portion forming an approximately "S-shaped" configuration in each of the air outlet channels.

20. The air flow guiding method for water ingress management according to claim 18, wherein mitigating water and debris ingress further includes positioning the downstream outlet opening offset further rearward from the front end of the motor vehicle than the respective upstream inlet opening for each of the air outlet channels.

* * * * *